United States Patent
Etezadi et al.

(10) Patent No.: US 10,432,391 B2
(45) Date of Patent: *Oct. 1, 2019

(54) SYSTEM AND METHOD OF DETECTING END OF SYNCHRONIZATION HEADER OF MODULATED SIGNALS

(71) Applicant: Samsung Electronics Co., Ltd., Suwon-si, Gyeonggi-do (KR)

(72) Inventors: Farrokh Etezadi, San Diego, CA (US); Linbo Li, San Diego, CA (US); Chun Kin Au Yeung, San Diego, CA (US); Xiaoqiang Ma, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,944

(22) Filed: Jul. 10, 2018

(65) Prior Publication Data
US 2018/0323955 A1 Nov. 8, 2018

Related U.S. Application Data

(63) Continuation of application No. 15/441,149, filed on Feb. 23, 2017, now Pat. No. 10,129,014.

(Continued)

(51) Int. Cl.
  *H04L 7/00* (2006.01)
  *H04L 25/03* (2006.01)
  *H04L 7/04* (2006.01)
(52) U.S. Cl.
  CPC ............ *H04L 7/0087* (2013.01); *H04L 7/042* (2013.01); *H04L 25/03019* (2013.01)

(58) Field of Classification Search
  CPC ........................................................ H04L 7/10
  See application file for complete search history.

(56) References Cited

U.S. PATENT DOCUMENTS 3,023,557 A 3/1962 Tannehill et al.
3,223,820 A 12/1965 Etsuyuki et al.
(Continued)

OTHER PUBLICATIONS

H.J. Jeon et al.. "IEEE 802.15.4 BPSK Reciever Architecture Based on a New Efficient Detection Scheme", In IEEE Transactions on Signal Processing, vol. 58, No. 9, pp. 4711-4719, Sep. 2010.
(Continued)

*Primary Examiner* — Berhanu Tadese
(74) *Attorney, Agent, or Firm* — Innovation Counsel LLP

(57) ABSTRACT

A receiver of a modulated signal is presented. The receiver includes a synchronization detector configured to receive a signal indicative of the modulated signal that includes a synchronization header and a data payload, and to detect an end of the synchronization header. The synchronization detector is configured to generate a differential signal based on the signal, perform cross-correlation of the differential signal with a reference differential signal to generate a cross-correlation output, compare a first sample of the cross-correlation output at a sample index associated with a hypothesized start frame delimiter (SFD) peak index with a second sample of the cross-correlation output at a sample index associated with a hypothesized preamble peak index, and detect an end of the synchronization header in response to a comparison result in which a magnitude of the first sample is greater than a magnitude of the second sample of the cross-correlation output.

20 Claims, 4 Drawing Sheets

Related U.S. Application Data

(60) Provisional application No. 62/450,261, filed on Jan. 25, 2017.

(56) References Cited

U.S. PATENT DOCUMENTS

| | | | | |
|---|---|---|---|---|
| 3,231,648 | A * | 1/1966 | Eyre | B22F 3/14 |
| | | | | 264/120 |
| 3,362,977 | A | 1/1968 | Berger | |
| 3,432,077 | A | 3/1969 | Voll | |
| 3,774,318 | A | 11/1973 | Sterriti | |
| 7,257,165 | B2 * | 8/2007 | Gardner | H04L 27/2662 |
| | | | | 370/203 |
| 7,366,204 | B2 * | 4/2008 | Kang | H04L 65/607 |
| | | | | 370/252 |
| 7,613,261 | B2 * | 11/2009 | Lee | H04L 7/042 |
| | | | | 375/331 |
| 7,983,235 | B2 | 7/2011 | Powell et al. | |
| 8,023,557 | B2 * | 9/2011 | Constantinidis | H04W 52/028 |
| | | | | 375/219 |
| 8,223,820 | B2 | 7/2012 | Rouxel | |
| 8,531,981 | B2 * | 9/2013 | Van Driest | H04B 1/7075 |
| | | | | 370/252 |
| 8,774,318 | B2 * | 7/2014 | Lakkis | H04J 13/0014 |
| | | | | 375/279 |
| 9,231,648 | B2 * | 1/2016 | Lingam | H04B 1/7075 |
| 9,362,977 | B2 * | 6/2016 | Mazurenko | H04B 1/70755 |
| 9,432,077 | B2 * | 8/2016 | Schmidl | H04B 1/707 |
| 2004/0120424 | A1 * | 6/2004 | Roberts | H04B 1/7163 |
| | | | | 375/327 |
| 2004/0136399 | A1 * | 7/2004 | Roberts | H04B 1/7172 |
| | | | | 370/468 |
| 2004/0142663 | A1 * | 7/2004 | Roberts | H04B 1/7172 |
| | | | | 455/73 |
| 2005/0008347 | A1 * | 1/2005 | Jung | H04N 5/44508 |
| | | | | 386/230 |
| 2005/0105595 | A1 * | 5/2005 | Martin | H04B 1/707 |
| | | | | 375/140 |
| 2005/0207519 | A1 * | 9/2005 | Phang | H04L 27/2278 |
| | | | | 375/354 |
| 2005/0220186 | A1 * | 10/2005 | Kohyama | H04B 1/7093 |
| | | | | 375/232 |
| 2005/0286661 | A1 * | 12/2005 | Kwak | H04B 1/7085 |
| | | | | 375/343 |
| 2006/0166619 | A1 * | 7/2006 | Roberts | H04B 1/7172 |
| | | | | 455/39 |
| 2008/0101508 | A1 * | 5/2008 | Oh | H04L 27/0014 |
| | | | | 375/344 |
| 2009/0116462 | A1 * | 5/2009 | Powell | H04B 1/707 |
| | | | | 370/338 |
| 2009/0168849 | A1 * | 7/2009 | Rouxel | H04B 1/707 |
| | | | | 375/140 |
| 2009/0285240 | A1 * | 11/2009 | Zhang | H04J 13/0014 |
| | | | | 370/476 |
| 2010/0054223 | A1 * | 3/2010 | Zhang | H04L 25/03343 |
| | | | | 370/338 |
| 2010/0080266 | A1 * | 4/2010 | Zhang | H04J 13/102 |
| | | | | 375/140 |
| 2010/0135335 | A1 * | 6/2010 | Matsumoto | H04H 20/74 |
| | | | | 370/503 |
| 2011/0039512 | A1 * | 2/2011 | Ferchland | H04W 52/0229 |
| | | | | 455/343.1 |
| 2011/0069707 | A1 * | 3/2011 | Roh | H04L 27/2071 |
| | | | | 370/392 |
| 2011/0216747 | A1 * | 9/2011 | Shao | H04W 56/005 |
| | | | | 370/338 |
| 2012/0033768 | A1 * | 2/2012 | Chang | H04L 27/2331 |
| | | | | 375/343 |
| 2013/0100867 | A1 * | 4/2013 | Picard | H04L 69/22 |
| | | | | 370/310 |
| 2013/0201965 | A1 * | 8/2013 | Schmidl | H04L 27/2613 |
| | | | | 370/336 |
| 2013/0208027 | A1 * | 8/2013 | Bae | G09G 3/3426 |
| | | | | 345/690 |
| 2015/0055526 | A1 * | 2/2015 | Shao | H04W 76/15 |
| | | | | 370/310.2 |
| 2015/0215968 | A1 * | 7/2015 | Jiang | H04W 74/0833 |
| | | | | 370/328 |
| 2018/0212749 | A1 * | 7/2018 | Au Yeung | H04L 7/0087 |

OTHER PUBLICATIONS

Y. Ma et al., "Design of OFDM Timing Synchronization Based on Correlations of Preamble Symbol", 2016 IEEE 83rd Vehicular Technology Conference (VTC Spring), Nanjing, 2016, pp. 1-5.

Kai-Hsin Chen and Hsi-Pin Ma, "A Low Power ZigBee Baseband Processor", 2008 International SoC Design Conference, Nov. 24, 2008, pp. I-40-I-43, IEEE.

* cited by examiner

SYSTEM AND METHOD OF DETECTING END OF SYNCHRONIZATION HEADER OF MODULATED SIGNALS

CROSS-REFERENCE TO RELATED APPLICATIONS

This application is a continuation of pending U.S. patent application Ser. No. 15/441,149, titled "SYSTEM AND METHOD OF PERFORMING INITIAL TIMING SYNCHRONIZATION OF RECEIVERS OF MODULATED SIGNALS", filed on Feb. 23, 2017, which claims priority to and the benefit of U.S. Provisional Patent Application No. 62/450,261, titled "APPARATUS AND METHOD FOR ROBUST INITIAL TIMING SYNCHRONIZATION OF RECEIVERS WITH PHASE SHIFT KEYING (PSK) MODULATION", filed on Jan. 25, 2017, which patents and patent applications are incorporated herein by reference for all purposes.

RELATED FIELD

The present disclosure relates in to wireless communications systems. In particular, the present disclosure relates to a system and method of performing initial timing synchronization of receivers of modulated signals.

BACKGROUND

Initial timing acquisition is fundamental in a baseband wireless modem design to enable a receiver of a modulated signal to know which part of the signal constitutes the data payload, so that valid data may be properly extracted from the signal. In many wireless communication standards, such as the IEEE 802.15.4 (ZigBee) standard, a synchronization header (SHR) including a preamble and a start frame delimiter (SFD) sequence is generally included at the beginning of the physical specification (PHY) packets containing the data. For example, according to the ZigBee standard, the preamble may include eight repetitions of a particular preamble pattern followed by the SFD, which indicates the end of the SHR and the start of the packet data. The receiver knows the preamble and exploits this knowledge to provide accurate synchronization information to all baseband modem blocks, such as a data demodulator.

Conventional techniques for initial timing acquisition, however, generally have several drawbacks. One drawback is that conventional techniques tend to require full preamble detection. Full preamble detection relies on detecting all peaks by correlating expected patterns, such as by a threshold-passing correlation-based method. This means that a high quality signal would be required during all expected preamble repetitions (≈128 μsec for the ZigBee standard). Detecting a lesser number of repetitions may not provide timing information, and reducing detection threshold may increase chances of false-alarms. Thus, conventional techniques that require full preamble detection may be vulnerable to noise, front-end settling and delay in preamble search.

Another drawback of the conventional techniques is that preamble detection and SFD detection are often implemented as two separate hardware mechanisms. For example, after detecting the requisite number of consecutive preamble repetitions by one hardware mechanism, another correlation-based hardware mechanism would attempt SFD detection. Separate detectors for preamble detection and SFD detection may significantly increase the amount and complexity of the receiver's hardware.

SUMMARY

According to an embodiment of the present disclosure, a receiver of a modulated signal includes a synchronization detector configured to receive a signal indicative of the modulated signal, the modulated signal including a synchronization header and a data payload, and to detect an end of the synchronization header in the signal. The synchronization detector is configured to generate a differential signal based on the signal, perform cross-correlation of the differential signal with a reference differential signal to generate a cross-correlation output, compare a first sample of the cross-correlation output at a sample index associated with a hypothesized start frame delimiter (SFD) peak index with a second sample of the cross-correlation output at a sample index associated with a hypothesized preamble peak index, and detect an end of the synchronization header in response to a comparison result in which a magnitude of the first sample of the cross-correlation output is greater than a magnitude of the second sample of the cross-correlation output.

According to another embodiment of the present disclosure, a method of synchronizing a receiver of a modulated signal includes receiving a signal indicative of the modulated signal, the modulated signal including a synchronization header and a data payload; generating a differential signal based on the signal; performing cross-correlation of the differential signal with a reference differential signal to generate a cross-correlation output; comparing a first sample of the cross-correlation output at a sample index associated with a hypothesized start frame delimiter (SFD) peak index with a second sample of the cross-correlation output at a sample index associated with a hypothesized preamble peak index; and detecting an end of the synchronization header in response to a comparison result in which a magnitude of the first sample of the cross-correlation output is greater than a magnitude of the second sample of the cross-correlation output.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

The figures in the drawings are not necessarily drawn to scale and elements of similar structures or functions are generally represented by like reference numerals for illustrative purposes throughout the figures. The figures are only intended to facilitate the description of the various embodi-

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

The present system and method of performing initial timing synchronization of receivers of modulated signals are applicable to wireless communication systems including, but not limited to, ZigBee, IEEE 802.15.4, and offset quadrature phase shifted keying (OQPSK) communications systems. In general, the present system and method offer robust initial timing acquisition with low hardware complexity for receivers that recover timing and/or frequency offset information from a synchronization header of a modulated signal.

According to one embodiment, the present system provides a finite state machine (FSM) based preamble detection scheme for initial timing acquisition in low-rate and low-cost OQPSK modulation based wireless communication. The present system provides subset peak detection by partially detecting the preamble so as to be robust to front-end transient and distortion. The partial detection may be a partial forepart, a partial middle-part, or a partial end part of the preamble signal. The present system further provides end of preamble detection. In one embodiment, the present system uses a common matched filter for both preamble detection and preamble ending pattern detection (e.g., SFD detection) by exploiting a special cross correlation property.

Accordingly, the present system provides subset peak detection that is robust to signal impairments due to noise, front-end settling, and delay in preamble search. Furthermore, hardware complexity is reduced by having a common (MF) matched filter. The end of preamble detection is further parameter independent by comparing MF output at two different times.

Figure 1:
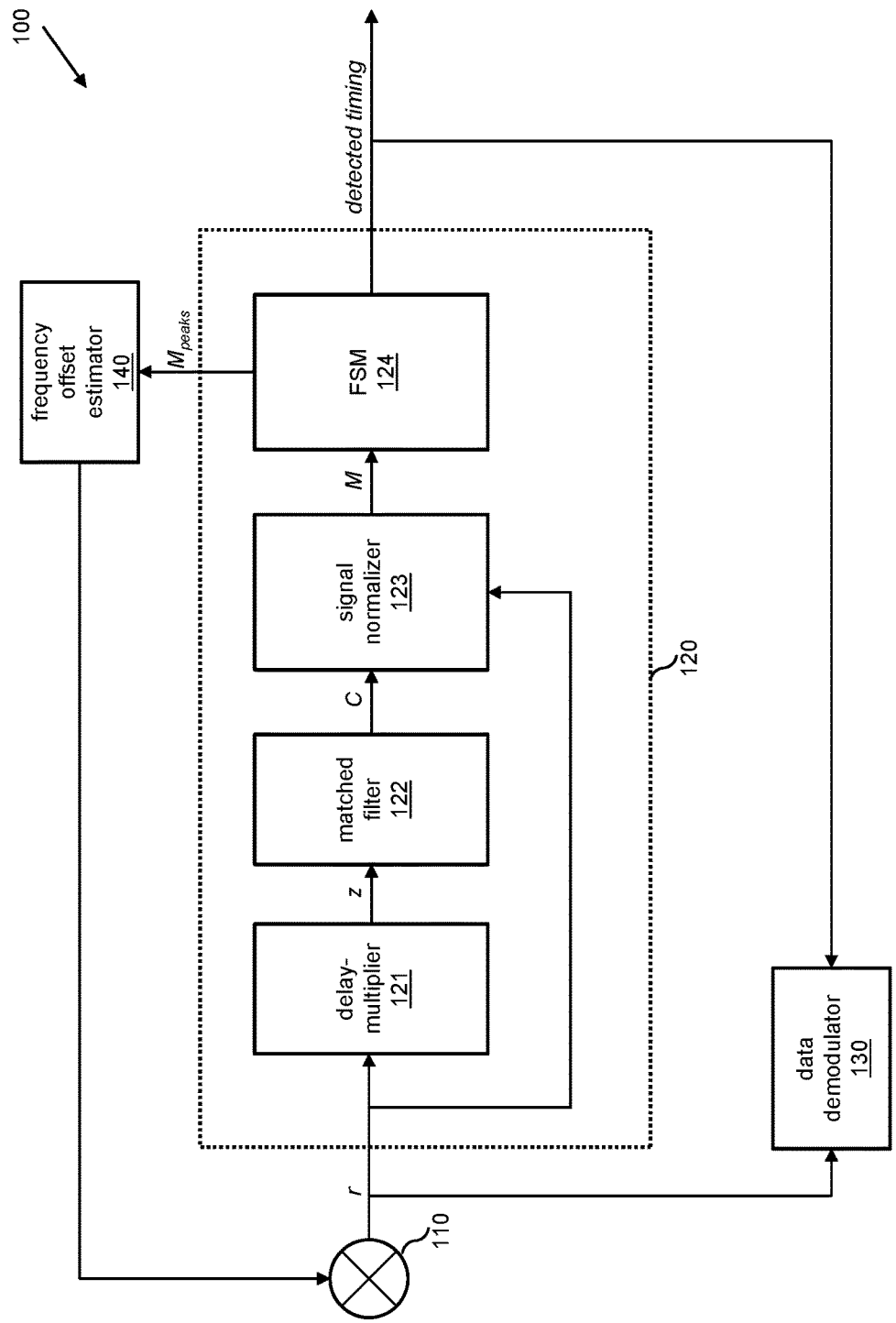
FIG. 1 illustrates an exemplary diagram of a receiver, according to an embodiment.

FIG. 1 illustrates an exemplary diagram of a receiver, according to an embodiment. The receiver 100, which may be implemented in an electronic device, such as a baseband modem or other electronic transceiver, includes a signal mixer 110, a synchronization detector 120, a data demodulator 130, and a frequency offset estimator 140. The signal mixer 110 is configured to perform baseband down-conversion of a signal (e.g., an RF signal in the case of a zero-IF receiver) according to a mixer frequency. The signal may include a synchronization header and a data payload. The synchronization detector 120 is configured to generate a differential signal based on the signal, perform cross-correlation of the differential signal with a reference differential signal to generate a cross-correlation output, and analyze the cross-correlation output to detect an end of the synchronization header. The data demodulator 130 is configured to demodulate the data payload in response to detection of the end of the synchronization header. The frequency offset estimator 140 is configured to calculate a frequency offset based on values of the cross-correlation output corresponding to peaks, and compensate a frequency offset of the signal by causing the signal mixer unit to increase or decrease the mixer frequency according to the calculated frequency offset. The synchronization detector 120 includes a delay-multiplier 121, a matched filter 122, a signal normalizer 123, and an FSM 124 for preamble detection. Although FIG. 1 shows these components as separate components, one or more of these components may be combined.

The delay-multiplier 121 receives an input signal r, which may be a complex baseband signal, from the signal mixer 110. For example, the signal r may include ZigBee formatted packets, wherein each packet includes a synchronization header (SHR) 201, a PHYS header (PHR) 202, and a PHY payload 203 containing the transmitted data, such as that shown in FIG. 2. The SHR may contain a preamble having four octets of zero bits and a start frame delimiter (SFD) having an octet of bits with the sequence '11100101'.

Furthermore, the signal r may be direct-sequence spread spectrum (DSSS) encoded, which maps four bits of data to 32 chips, or pulse values, to increase resistance to interference or noise. For example, each data symbol corresponding to a different 4-bit sequence may be mapped to one of sixteen 32-chip pseudo-random noise (PN) sequences, such as specified in Table 1 below. The PN sequences are related to each other through cyclic shifts and/or conjugation (i.e., inversion of odd-indexed chip values).

TABLE 1

Example Symbol-to-Chip mapping

| Data Symbol | Bit Sequence | Chip Values ($c_0 c_1 \ldots c_{30} c_{31}$) |
|---|---|---|
| 0 | 0000 | 1 1 0 1 1 0 0 1 1 1 0 0 0 0 1 1 0 1 0 1 0 0 1 0 0 0 1 0 1 1 1 0 |
| 1 | 1000 | 1 1 1 0 1 1 0 1 1 0 0 1 1 1 0 0 0 0 1 1 0 1 0 1 0 0 1 0 0 0 1 0 |
| 2 | 0100 | 0 0 1 0 1 1 1 0 1 1 0 1 1 0 0 1 1 1 0 0 0 0 1 1 0 1 0 1 0 0 1 0 |
| 3 | 1100 | 0 0 1 0 0 0 1 0 1 1 1 0 1 1 0 1 1 0 0 1 1 1 0 0 0 0 1 1 0 1 0 1 |
| 4 | 0010 | 0 1 0 1 0 0 1 0 0 0 1 0 1 1 1 0 1 1 0 1 1 0 0 1 1 1 0 0 0 0 1 1 |
| 5 | 1010 | 0 0 1 1 0 1 0 1 0 0 1 0 0 0 1 0 1 1 1 0 1 1 0 1 1 0 0 1 1 1 0 0 |
| 6 | 0110 | 1 1 0 0 0 0 1 1 0 1 0 1 0 0 1 0 0 0 1 0 1 1 1 0 1 1 0 1 1 0 0 1 |
| 7 | 1110 | 1 0 0 1 1 1 0 0 0 0 1 1 0 1 0 1 0 0 1 0 0 0 1 0 1 1 1 0 1 1 0 1 |
| 8 | 0001 | 1 0 0 0 1 1 0 0 1 0 0 1 0 1 1 0 0 0 0 0 1 1 1 0 1 1 1 1 0 1 1 1 |
| 9 | 1001 | 1 0 1 1 1 0 0 0 1 1 0 0 1 0 0 1 0 1 1 0 0 0 0 0 1 1 1 0 1 1 1 1 |
| 10 | 0101 | 0 1 1 1 1 0 1 1 1 0 0 0 1 1 0 0 1 0 0 1 0 1 1 0 0 0 0 0 1 1 1 1 |
| 11 | 1101 | 0 1 1 1 0 1 1 1 1 0 1 1 1 0 0 0 1 1 0 0 1 0 0 1 0 1 1 0 0 0 0 0 |
| 12 | 0011 | 0 0 0 0 0 1 1 1 0 1 1 1 1 0 1 1 1 0 0 0 1 1 0 0 1 0 0 1 0 1 1 0 |

TABLE 1-continued

Example Symbol-to-Chip mapping

| Data Symbol | Bit Sequence | Chip Values ($c_0 c_1 \ldots c_{30} c_{31}$) |
| --- | --- | --- |
| 13 | 1011 | 0 1 1 0 0 0 0 0 0 1 1 1 0 1 1 1 1 0 1 1 1 0 0 0 1 1 0 0 1 0 0 1 |
| 14 | 0111 | 1 0 0 1 0 1 1 0 0 0 0 0 0 1 1 1 0 1 1 1 1 0 1 1 1 0 0 0 1 1 0 0 |
| 15 | 1111 | 1 1 0 0 1 0 0 1 0 1 1 0 0 0 0 0 0 1 1 1 0 1 1 1 1 0 1 1 1 0 0 0 |

Thus, in the case of a Zigbee formatted signal, the preamble, which is eight repetitions of the bit sequence '0000', corresponds to eight repetitions of the chip sequence '1 1 0 1 1 0 0 1 1 1 0 0 0 0 1 1 0 1 0 1 0 0 1 0 0 0 1 0 1 1 1 0' after DSSS encoding. The term "chip" and "pulse" are used interchangeably herein for convenience of description. Although the chip values in Table 1 are shown as having a value of 0 or 1, the chip values may alternatively have a value of −1 or 1, depending on usage.

Figures 2, 3:
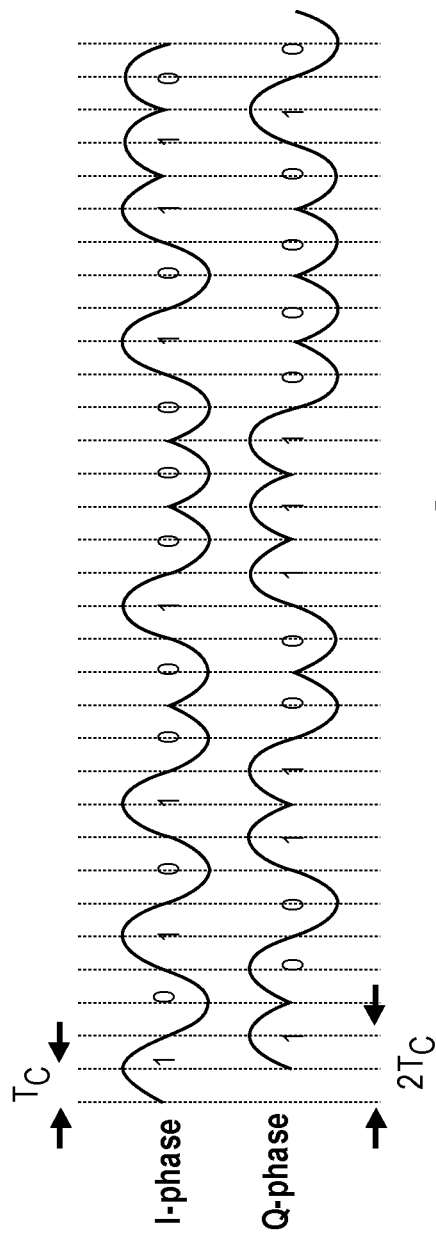
FIG. 2 illustrates an exemplary ZigBee formatted packet, according to an embodiment.
FIG. 3 illustrates an exemplary waveform of a complex baseband signal, according to an embodiment.

FIG. 3 shows an exemplary waveform of the signal r, according to an embodiment. The signal r, which is a down-converted baseband signal of a OQPSK modulated signal, includes an in-phase component (I) and a quadrature component (Q) offset by a chip duration Tc. The signal r is half-sine pulse shaped using:

$$p(t) = \begin{cases} \sin\left(\pi \frac{t}{2T_c}\right), & 0 \le t < 2T_c \\ 0, & \text{otherwise} \end{cases}$$

The exemplary waveform of FIG. 3 shows the chip values corresponding to the data symbol 0 of Table 1. The 32 chips are divided into odd and even groups to generate the in-phase and quadrature components.

Referring back to FIG. 1, the delay-multiplier 121 multiplies a current sample of the signal r by a delayed-conjugate input sample with a predetermined delay value. That is, the delay-multiplier 121 is configured to generate a differential signal according to the expression:

$$z_n = r_n r^*_{n-D \times OSR}$$

wherein r represents the signal, r* represents the complex conjugate of r, z represents the differential signal value, n represents a sample time index, D represents a delay value, which may be a design parameter, and OSR represents an oversampling ratio. According to one embodiment, the value of OSR is 16 samples per chip for chip duration Tc=0.5 µs (i.e., 32 MHz sampling).

The delay-multiplier 121 provides the output $z_n$ to the matched filter 122. The matched filter 122 may be used for both subset preamble peak detection and preamble ending pattern detection (e.g., SFD detection). The matched filter 122 cross-correlates the differential signal $z_n = r_n r^*_{n-D \times OSR}$ with a reference differential signal. For example, the matched filter 122 may perform cross-correlation of the differential signal with the reference differential signal according to the expression:

$$C_n = \sum_{i=0}^{L-1} (r_{n-i} r^*_{n-i-D \times OSR}) d_{L-i-1}$$

where C represents the cross-correlation output, d represents the reference differential signal, and L represents a length of the reference differential signal.

The reference differential signal d is calculated according to the expression:

$$d_k = p_k p^*_{k+D \times OSR} \text{ for } 0 \le k \le L-1$$

where p represents a preamble sequence of the synchronization header, p* represents the complex conjugate of p, and k represents a sample time index. In other words, the matched filter 122 tries to find a match between the differential signal and a delay-multiple of portion of the preamble, i.e., one out of eight repetitions of preamble sequence. According to one embodiment, the differential reference signal d may be as long as 32×OSR samples (one repetition of preamble), and the cross-correlation may be performed over a down sampled version of the original signal that has L≤32*OSR samples.

The matched filter 122 provides the cross-correlation output C to the signal normalizer 123, which normalizes the output C with respect to a power estimation of the signal r. For example, the signal normalizer 123 may normalize the cross-correlation output C according to the expression:

$$M_n = \frac{C_n}{L \times P_n}$$

where P represents an estimated power of the signal r, and M is the normalized value of C. The estimated power P may be determined using a moving average of the signal r as follows:

$$P_n = \frac{1}{L} \sum_{i=0}^{L-1} |r_{n-i}|^2$$

In another example, the estimated power P may be determined using an infinite impulse response (IIR) filter as follows:

$$P_n = \alpha |x_n|^2 + (1-\alpha) P_{n-1}$$

In another example, the average power $P_n$ may be determined using an average power calculated at a different modem block, such as a digital automatic gain control (AGC) block. The signal normalizer 123 provides the normalized cross-correlation output M to the FSM 124 for preamble subset peak detection and end of preamble detection.

Figure 4:
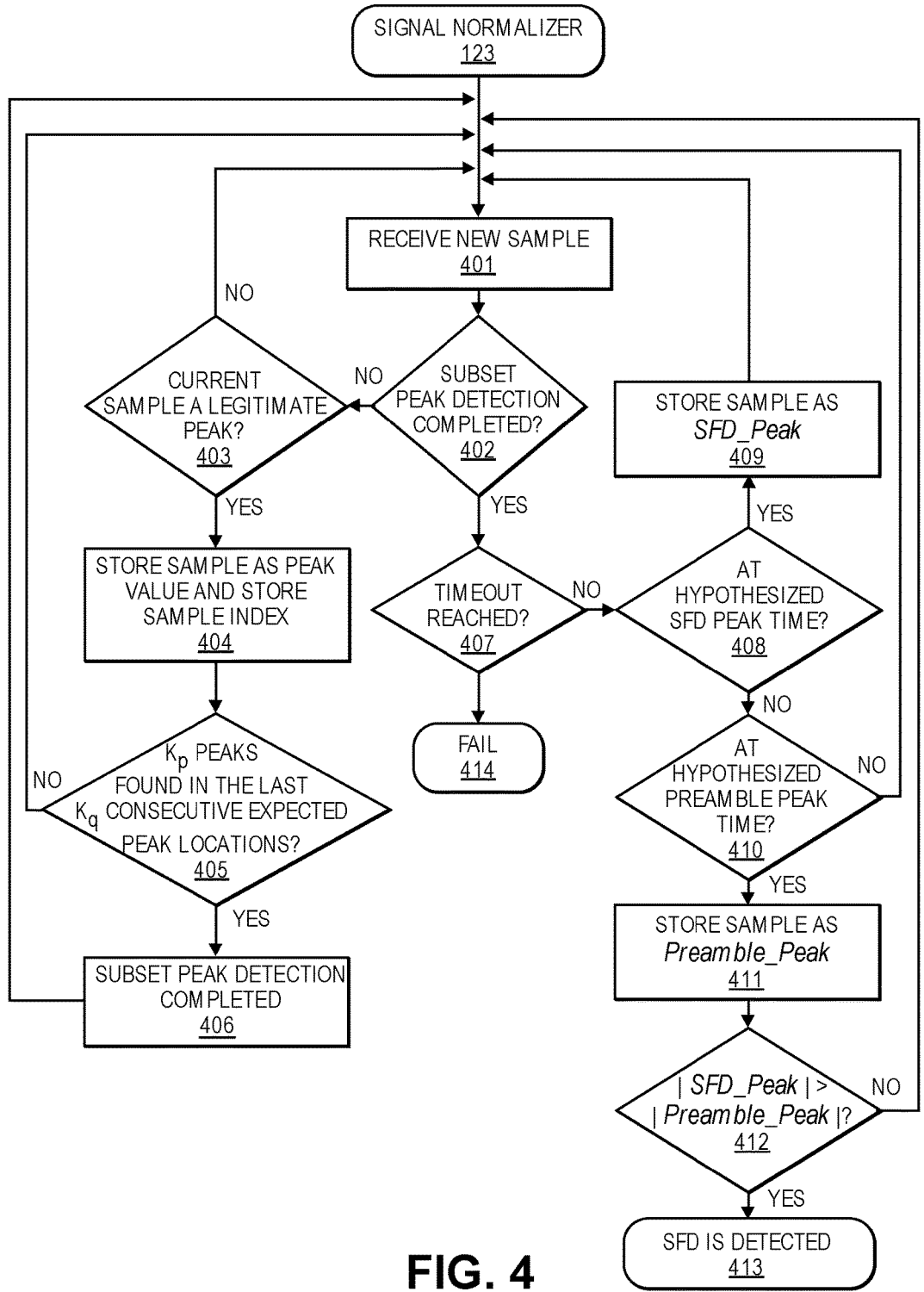
FIG. 4 illustrates an exemplary flowchart of operations performed by a finite state machine for preamble subset peak detection and SFD detection, according to an embodiment.

FIG. 4 illustrates an exemplary flowchart of operations performed by a finite state machine for preamble subset peak detection and SFD detection, according to an embodiment. Although the FSM 124 is described as performing the operations below, the present system and method are not limited thereto. For example, some of the operations may be performed by other components.

The FSM 124 receives a sample of the cross-correlation output from the signal normalizer 123 (at 401). The FSM 124 determines if subset peak detection has been completed (at 402). If the subset peak detection has not been completed, the FSM 124 checks whether the sample is a legitimate peak (at 403). The sample may be a legitimate peak if a magnitude of the sample is (i) greater than a threshold and (ii) greater than the magnitudes of adjacent samples, according to one embodiment.

If the sample is not a legitimate peak, the FSM 124 proceeds to analyze the next sample. If the sample is a legitimate peak, the FSM 124 stores the sample as a peak, as well as stores an index of the sample (at 403). The FSM 124 determines whether a $K_p$ number of stored samples, which correspond to legitimate peaks, are found in the last $K_q$ number of consecutive expected peak locations, $K_p$ and $K_q$ being natural numbers, and $K_p \leq K_q$ (at 405). If $K_p$ peaks have been found in the last $K_q$ expected peak locations, the subset peak detection is deemed to be completed (at 406), and the FSM 124 proceeds to analyze the next sample (at 401). Similarly, if $K_p$ peaks have not been found in the last $K_q$ expected peak locations, the FSM 124 proceeds to analyze the next sample (at 401).

If the subset peak detection has been completed but timeout (at 407) is reached, the FSM 124 determines that initial synchronization has failed (at 414). However, if timeout has not been reached, the FSM 124 determines whether the sample index for the current sample corresponds to a first expected time index, which may be a hypothesized SFD peak index where a correlation peak generated by the SFD is expected (at 408). If the sample index equals the hypothesized SFD peak index, the FSM 124 stores the current sample as SFD Peak (at 409).

If the sample index does not equal the hypothesized SFD peak index, the FSM 124 determines whether the sample index is at a second time index, which may be a hypothesized preamble peak index (at 410). If the sample index equals the hypothesized preamble peak index, the FSM 124 stores the current sample as Preamble_Peak (at 411). The FSM 124 compares |Preamble_Peak| to |SFD_Peak| to determine whether the SFD is detected (at 412). If |Preamble_Peak|<|SFD_Peak|, the SFD is deemed to be detected (at 413). Otherwise, the FSM 124 continues to analyze the next sample (at 401).

Figure 5:
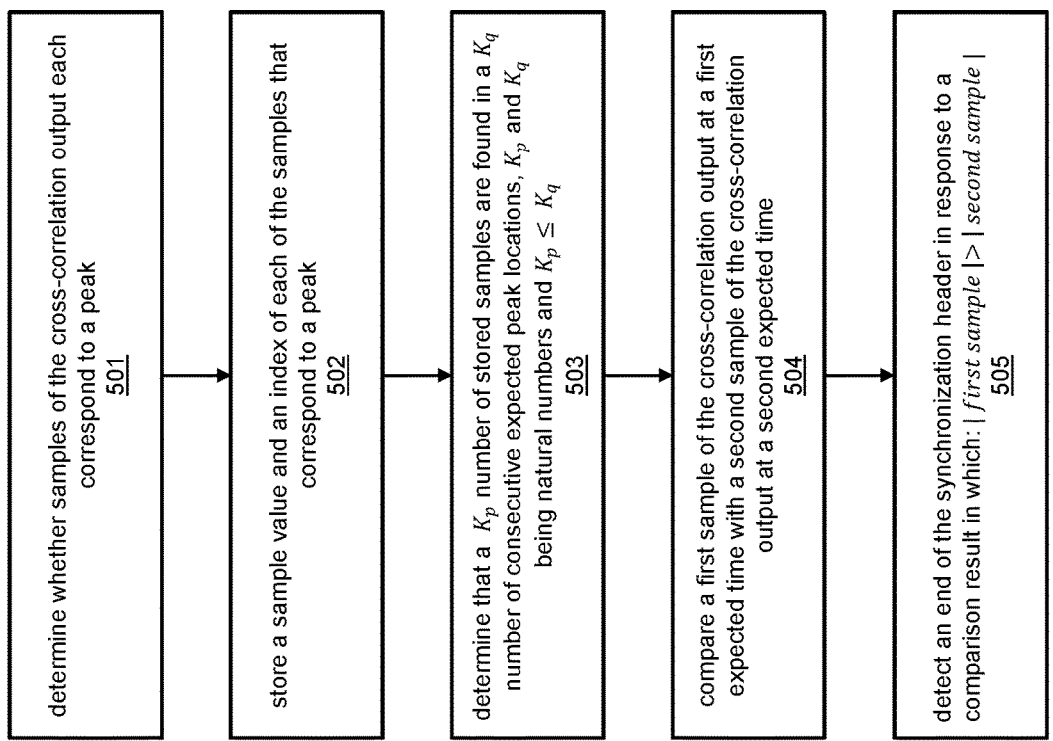
FIG. 5 illustrates an exemplary flowchart for preamble subset peak detection and SFD detection, according to an embodiment.

FIG. 5 illustrates an exemplary flowchart for preamble subset peak detection and SFD detection, according to an embodiment. The FSM determines whether samples of the cross-correlation output each correspond to a peak (at 501). The FSM stores a sample value and an index of each of the samples that correspond to a peak (at 502). The FSM determines that a $K_p$ number of stored samples are found in a $K_q$ number of consecutive expected peak locations, $K_p$ and $K_q$ being natural numbers and $K_p \leq K_q$ (at 503). The FSM compares a first sample of the cross-correlation output at a first expected time with a second sample of the cross-correlation output at a second expected time (at 504). The first expected time may be at 28×OSR samples after a last preamble peak, and the second expected time may be at 32×OSR samples after the last preamble peak, where OSR represents an oversampling ratio. The FSM detects an end of the synchronization header in response to a comparison result in which:

|first sample|>|second sample|

(at 505).

As mentioned earlier, the frequency offset estimator 140 may be configured to calculate a frequency offset based on values of the cross-correlation output corresponding to peaks, and compensate a frequency offset of the signal by causing the signal mixer to increase or decrease the mixer frequency according to the calculated frequency offset. According to one embodiment, the frequency offset estimator 140 may calculate the frequency offset $\hat{f}_o$ according to the expression:

$$\hat{f}_o = \frac{1}{2\pi D \times OSR \times T_s} \arg\left\{ \sum_{i \text{ is peak}} M_i \right\}$$

where $$T_s = \frac{10^{-6}}{2 \times OSR}.$$

Accordingly, in view of the foregoing, embodiments of the present system and method provide robust initial timing acquisition with low hardware complexity for receivers that recover timing and/or frequency offset information from the preamble of a modulated signal. According to one embodiment, the present system and method exploit the property that there is a strong cross correlation between the differential preamble symbol, i.e., $p_i p^*_{i+D \times OSR}$, and the differential of first SFD symbol (symbol index 14, or b1110), at a delay of 4 chips away, i.e., 64 samples with 16 OSR, thereby allowing a common matched filter to be used for both preamble subset peak detection and preamble end detection.

Various embodiments of the present system and method may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A receiver of a modulated signal, the receiver comprising:
    a synchronization detector configured to receive a signal indicative of the modulated signal, the modulated signal including a synchronization header and a data payload, and to detect an end of the synchronization header in the signal, wherein the synchronization detector is configured to:
    generate a differential signal based on the signal,
    perform cross-correlation of the differential signal with a reference differential signal to generate a cross-correlation output,
    compare a first sample of the cross-correlation output at a sample index associated with a hypothesized start frame delimiter (SFD) peak index with a second sample of the cross-correlation output at a sample index associated with a hypothesized preamble peak index, and
    detect an end of the synchronization header in response to a comparison result in which a magnitude of the first sample of the cross-correlation output is greater than a magnitude of the second sample of the cross-correlation output.

2. The receiver of claim 1, wherein the first sample of the cross-correlation output corresponds to the sample index at a first expected time at which a correlation peak is expected to be generated by the start frame delimiter (SFD) of the signal; and the second sample of the cross-correlation output corresponds to the sample index at a second expected time at which a correlation peak is expected to be generated by the preamble.

3. The receiver of claim 1, wherein the synchronization detector further comprises a delay-multiplier configured to generate the differential signal according to the expression:

$$z_n = r_n r^*_{n-D \times OSR}$$

wherein r represents the signal, r* represents the complex conjugate of r, represents the differential signal value, represents a sample time index, D represents a delay value, and OSR represents an oversampling ratio.

4. The receiver of claim 3, wherein the synchronization detector further comprises a matched filter configured to perform cross-correlation of the differential signal with the reference differential signal according to the expression:

$$C_n = \sum_{i=0}^{L-1} (r_{n-i} r^*_{n-i-D \times OSR}) d_{L-i-1}$$

where C represents the cross-correlation output, d represents the reference differential signal, L represents a length of the reference differential signal, x denotes the multiplication symbol, and i represents a sample time index.

5. The receiver of claim 4, wherein the reference differential signal d is calculated according to the expression:

$$d_k = p_k p^*_{k+D \times OSR} \text{ for } 0 \le k \le L-1$$

where p represents a preamble sequence of the synchronization header, p represents the complex conjugate of p, and k represents a sample time index.

6. The receiver of claim 4, wherein the synchronization detector further comprises a signal normalizer configured to normalize the cross-correlation output according to the expression:

$$M_n = \frac{C_n}{L \times P_n}$$

where P represents an estimated power of the signal r, M is the normalized value of C, and x denotes the multiplication symbol.

7. The receiver of claim 5, wherein the preamble sequence corresponds to the preamble sequence of a ZigBee formatted data packet.

8. The receiver of claim 2, wherein the first expected time is at 28×OSR samples after a last preamble peak, and the second expected time is at 32×OSR samples after the last preamble peak, where OSR represents an oversampling ratio.

9. The receiver of claim 1, further comprising:
    a signal mixer configured to perform baseband down-conversion of the modulated signal according to a mixer frequency to generate the signal;
    a data demodulator configured to demodulate the data payload in response to detection of the end of the synchronization header; and
    a frequency offset estimator configured to:
    calculate a frequency offset based on the stored sample values, and compensate a frequency offset of the signal by causing the signal
    mixer to increase or decrease the mixer frequency according to the calculated frequency offset.

10. A method of synchronizing a receiver of a modulated signal, the method comprising:
    receiving a signal indicative of the modulated signal, the modulated signal including a synchronization header and a data payload;
    generating a differential signal based on the signal;
    performing cross-correlation of the differential signal with a reference differential signal to generate a cross-correlation output;
    comparing a first sample of the cross-correlation output at a sample index associated with a hypothesized start frame delimiter (SFD) peak index with a second sample of the cross-correlation output at a sample index associated with a hypothesized preamble peak index; and
    detecting an end of the synchronization header in response to a comparison result in which a magnitude of the first sample of the cross-correlation output is greater than a magnitude of the second sample of the cross-correlation output.

11. The method of claim 10, wherein the first sample of the cross-correlation output corresponds to the sample index at a first expected time at which a correlation peak is expected to be generated by the start frame delimiter (SFD) of the signal; and the second sample of the cross-correlation output corresponds to the sample index at a second expected time at which a correlation peak is expected to be generated by the preamble.

12. The method of claim 10, wherein generating a differential signal based on the signal comprises generating the differential signal according to the expression:

$$z_n = r_n r^*_{n-D \times OSR}$$

wherein r represents the signal, r* represents the complex conjugate of r, z represents the differential signal value, n represents a sample time index, D represents a delay value, and OSR represents an oversampling ratio.

13. The method of claim 12, wherein performing cross-correlation of the differential signal with the reference differential signal to generate the cross-correlation output comprises performing cross-correlation of the differential signal with the reference differential signal according to the expression:

$$C_n = \sum_{i=0}^{L-1} (r_{n-i} r^*_{n-i-D \times OSR}) d_{L-i-1}$$

where C represents the cross-correlation output, d represents the reference differential signal, L represents a length of the reference differential signal, x denotes the multiplication symbol and i represents a sample time index.

14. The method of claim 13, further comprising:
calculating the reference differential signal d according to the expression:

$$d_k = p_k p^*_{k+D \times OSR} \text{ for } 0 \leq k \leq L-1$$

where p represents a preamble sequence of the synchronization header, p* represents the complex conjugate of p, and k represents a sample time index.

15. The method of claim 13, further comprising:
subsequent to performing cross-correlation, normalizing the cross-correlation output according to the expression:

$$M_n = \frac{C_n}{L \times P_n}$$

where P represents an estimated power of the signal r, M is the normalized value of C, and x denotes the multiplication symbol.

16. The method of claim 14, wherein the preamble sequence corresponds to the preamble sequence of a ZigBee formatted data packet.

17. The method of claim 11, wherein the first expected time is at 28×OSR samples after a last preamble peak, and the second expected time is at 32×OSR samples after the last preamble peak, where OSR represents an oversampling ratio.

18. The method of claim 10, further comprising:
performing baseband down-conversion, by a signal mixer, of the modulated signal according to a mixer frequency to generate the signal;
operating a data demodulator in response to detection of the end of the synchronization header to demodulate the data payload;
calculating a frequency offset based on the stored sample values; and
compensating a frequency offset of the signal by causing the signal mixer to increase or decrease the mixer frequency according to the calculated frequency offset.

19. The method of claim 10, wherein performing cross-correlation of the differential signal with a reference differential signal to generate a cross-correlation output comprises performing cross-correlation of the differential signal with a reference differential signal using a matched filter to generate the cross-correlation output.

20. The method of claim 19, wherein performing cross-correlation of the differential signal using the matched filter comprises:
performing cross-correlation of the differential signal using the matched filter to generate the first sample of the cross-correlation output and the second sample of the cross-correlation output.

* * * * *